United States Patent [19]

Minoshima

[11] Patent Number: 4,581,806
[45] Date of Patent: Apr. 15, 1986

[54] METHOD OF MANUFACTURING BOBBINS FOR INDUSTRIAL USE

[75] Inventor: Manji Minoshima, Gifu, Japan

[73] Assignee: Futaba Bobbin Kabushiki Kaisha, Gifu, Japan

[21] Appl. No.: 618,826

[22] Filed: Jun. 8, 1984

[51] Int. Cl.$^4$ .................. B23P 19/04; B29C 45/00
[52] U.S. Cl. .................................. 29/460; 29/510; 29/516; 264/156; 264/251; 264/254; 264/263; 264/273; 264/274; 264/278
[58] Field of Search ............ 264/156, 263, 273, 274, 264/275, DIG. 67, 278, 251, 254; 425/DIG. 47; 29/765, 460, 510, 516

[56] References Cited

U.S. PATENT DOCUMENTS

| | | | |
|---|---|---|---|
| 3,256,378 | 6/1966 | Hauf | 264/275 |
| 3,263,520 | 8/1966 | Tschanz | 264/278 |
| 3,374,538 | 3/1968 | Murray | 264/275 |
| 3,980,248 | 9/1976 | Minoshima . | |

FOREIGN PATENT DOCUMENTS 45-13382  6/1970  Japan .
54-106321 7/1979  Japan .

Primary Examiner—Jan Silbaugh
Assistant Examiner—Hubert C. Lorin
Attorney, Agent, or Firm—Wenderoth, Lind & Ponack

[57] ABSTRACT

A method of manufacturing a bobbin in which a plastic flange is first insert molded to one end of a winding shaft of nonferrous metal alloy. A bushing of synthetic resin is the forced into a bore in the winding shaft at the other end thereof, and a core having a head is inserted into a bore in the bushing to close an open end of the bore in the bushing with the head of the core. The end of the winding shaft, an outer end of the bushing, and the head of the core are placed in a mold, and a synthetic resin material is injected through a sprue, a runner, and a gate in the mold into a cavity therein to mold a second flange on the end of the winding shaft therearound to obtain a bobbin having plastic flanges at both ends.

7 Claims, 6 Drawing Figures

METHOD OF MANUFACTURING BOBBINS FOR INDUSTRIAL USE

BACKGROUND OF THE INVENTION

1. Field of the Invention

The present invention relates to a method of manufacturing a bobbin for industrial use which has a flange made of synthetic resin on an end of a winding shaft made of nonferrous metal alloy. The invention is primarily concerned with the art of winding a filamentary material in the textile industry (IPC B65H54/00).

2. Description of the Prior Art

Bobbins for industrial use which comprise a winding shaft of nonferrous metal alloy and flanges of synthetic resin mounted respectively on both ends of the winding shaft, are presently commercially available in Japan, the U.S.A., and European countries. According to the method normally carried out for manufacturing such bobbins, a flange is formed by insert molding on an end of a winding shaft, for example, the end of the winding to which a spindle will be attached for rotating the bobbin during use. This manufacturing process is preferred since it is easy to insert a metal shaft into the bore in the winding shaft to enable the latter to withstanding the molding pressure during the molding step, and also it is easy to remove the metal shaft out of the bore in the winding shaft away from the formed flange. Therefore, no problem exists in forming a flange of synthetic resin on one end of a winding shaft in bobbins for industrial use. However, it has not been practiced to mold another flange on the other end of the winding shaft though the addition of such a flange is considered preferable. During the molding operation, the winding shaft could not withstand the molding pressure unless a metal shaft were inserted in the bore in the winding shaft. The metal shaft, however, could not be pulled out through the flange molded earlier on the end of the winding shaft after the additional flange has been formed. The first molded on the winding shaft has an axial hole having a diameter of smaller than the inside diameter of the metal shaft. As a consequence, the additional flange could not be molded on the other end of the winding shaft unless the metal shaft were inserted into the winding shaft bore from the other end thereof and then pulled out through the same other end after the flange has been formed thereon. For the above reason, it has been impossible to form a flange on the end of the winding shaft opposite to the flange end thereof.

To cope with the foregoing difficulty, the manufacturing process now practiced in the art includes the steps of forming a flange on one end of a winding shaft by insert molding, then forming screw threads on the inner peripheral surface of the bore in the winding shaft at the other end, forming screw threads on a projection on a separately formed flange having a T-shaped cross section, then threading the externally threaded flange projection into the internally threaded bore in the winding shaft to thereby fasten the flange to the other end of the winding shaft. Since the bore in the winding shaft has to be internally threaded, the winding shaft must be of an increased thickness, and hence is heavy. This manufacturing process requires the additional steps of threading the flange projection and the winding shaft bore. As the flange cannot sufficiently be fastened to the winding shaft merely by threading the flange projection into the winding bore, it has been necessary to insert a screw threadedly into the winding shaft from the outer side of the flange. The fastened flange tends to become loose and has to be frequently re-tightened during use because the flange is only mechanically fixed to the winding shaft. Therefore, the bobbin cannot be used for a prolonged period of time.

To solve the above disadvantages, the following manufacturing process has been practiced by some manufacturers in Japan: An end of a winding shaft is disposed in a molding die having a cavity shaped complementarily to a flange to be formed, and a melted mass of resin material is injected into the die cavity to mold the flange around the winding shaft end. The molding die has one or two gates positioned closely to the cavity and through which the resin material flows into the cavity. Since the melted resin is injected through the one or two gates into the cavity, the molded flange has a weld line and suffers molecular orientations at different densities of the resin material due to different injection pressures and different speeds at which the flange is cooled. With such a weld line and molecular orientations at different densities, the bobbin will be warped or vibrated and have increased out-of-roundness as the bobbin is rotated at a high speed such as a few thousands r.p.m. in operation, with the results that the bobbin will be out of balance and lowered in mechanical strength during high-speed rotation. It has been found that the mechanical strength of the portion of the flange which suffers the weld line is reduced 20% to 40% (Japanese Laid-Open Utility Model Publication No. 54-106321 published on July 26, 1979).

Japanese Utility Model Publication No. 45-13382 published on June 9, 1970 discloses a bobbin including a winding shaft of nonferrous metal having opposite ends bent at a right angle and a cylindrical bushing of synthetic resin inserted in the bore in the winding shaft. The bushing has an outer end projecting slightly from the end of the winding shaft and is joined to the winding shaft by an adhesive. A flange is injection-molded of synthetic resin around the projecting end of the bushing and the bent end of the winding shaft, thus providing an integral construction of the bushing, the bent end of the winding shaft, and the flange. With the disclosed bobbin arrangement, however, the bushing and the winding shaft are of different materials and bonded together. As the different materials are relatively poor in their being securely bonded together, the bonding strength tends to become weak in use over a period of time and thus the bushing and the winding shaft finally wobble relatively to each other, whereupon the bobbin can no longer be put to use. The flange molded around the projecting end of the bushing and the bent end of the winding shaft is, however, not joined sufficiently, and is frequently brought out of balance during high-speed rotation.

In the prior art bobbin disclosed in the latter publication, the end of the winding shaft or barrel of nonferrous metal for winding a filamentary material is bent into the flange around the bushing. In the bobbin shown in the former publication, the winding shaft has an end shaped into corrugated cross section including radially outward ridges before the flange is molded on the end of the winding shaft. Since the bent or corrugated end portion is formed of nonferrous metal, it cannot have a mechanical strength large enough to withstand the force acting axially on the flange from an inner side toward an outer side thereof due to the stress from the filamentary material wound on the winding shaft, even if the winding shaft is tempered or quenched.

SUMMARY OF THE INVENTION

It is an object of the present invention to provide a bobbin which is well balanced and has an increased mechanical strength.

Another object of the present invention is to provide a bobbin of small out-of-roundness which is free from warping and vibrations.

According to the present invention, there is provided a method of molding a flange of synthetic resin on an end of a winding shaft of nonferrous metal alloy of a bobbin for industrial use, comprising the steps of forcing a bushing of synthetic resin into a bore in the winding shaft at the end thereof, inserting a core having a head into a bore in the bushing at an end thereof to close an opening of the bore at the end of the bushing, placing the end of the winding shaft, the end of the bushing, and the head of the core in a mold having a sprue to define a runner and an annular gate in coaxial alignment with an axis of the winding shaft and a cavity around the winding shaft, and injecting a synthetic resin material through the sprue, the runner, and the annular gate radially outwardly into the cavity to thereby mold the flange on the winding shaft.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
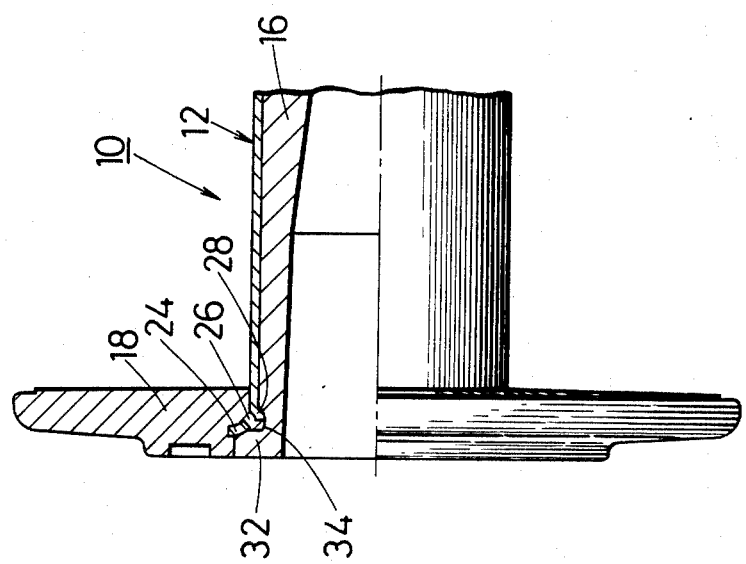
FIG. 1 is a fragmentary cross-sectional view of a bobbin manufactured according to a method of the present invention.

The present invention is directed principally to a process of molding a flange on an end of a winding shaft after another flange has been formed on an opposite end of the winding shaft by insert molding. Therefore, any process of molding the first flange on one end of the winding shaft will not be described hereinbelow, but only the subsequent process of molding the second flange on the other end will be described. The present invention is not limited in any way to the construction of the first flange on the one end and the process of molding the first flange.

For manufacturing a bobbin 10, there are prepared in advance a winding shaft 12 made of nonferrous metal alloy, a bushing 16 of synthetic resin which is to be press-fitted in a bore 14 in the winding shaft 12, a core 20 of metal used for molding a flange 18 of synthetic resin around an end of the winding shaft 12, a mold 22, and a resin material.

The winding shaft 12 is in the form of a hollow cylinder made of a nonferrous metal alloy such as an aluminum alloy or a stainless steel alloy. The winding shaft 12 has an open peripheral edge flaring radially outwardly into a coupling flange 24 as shown in FIGS. 2 and 3.

Figure 2:
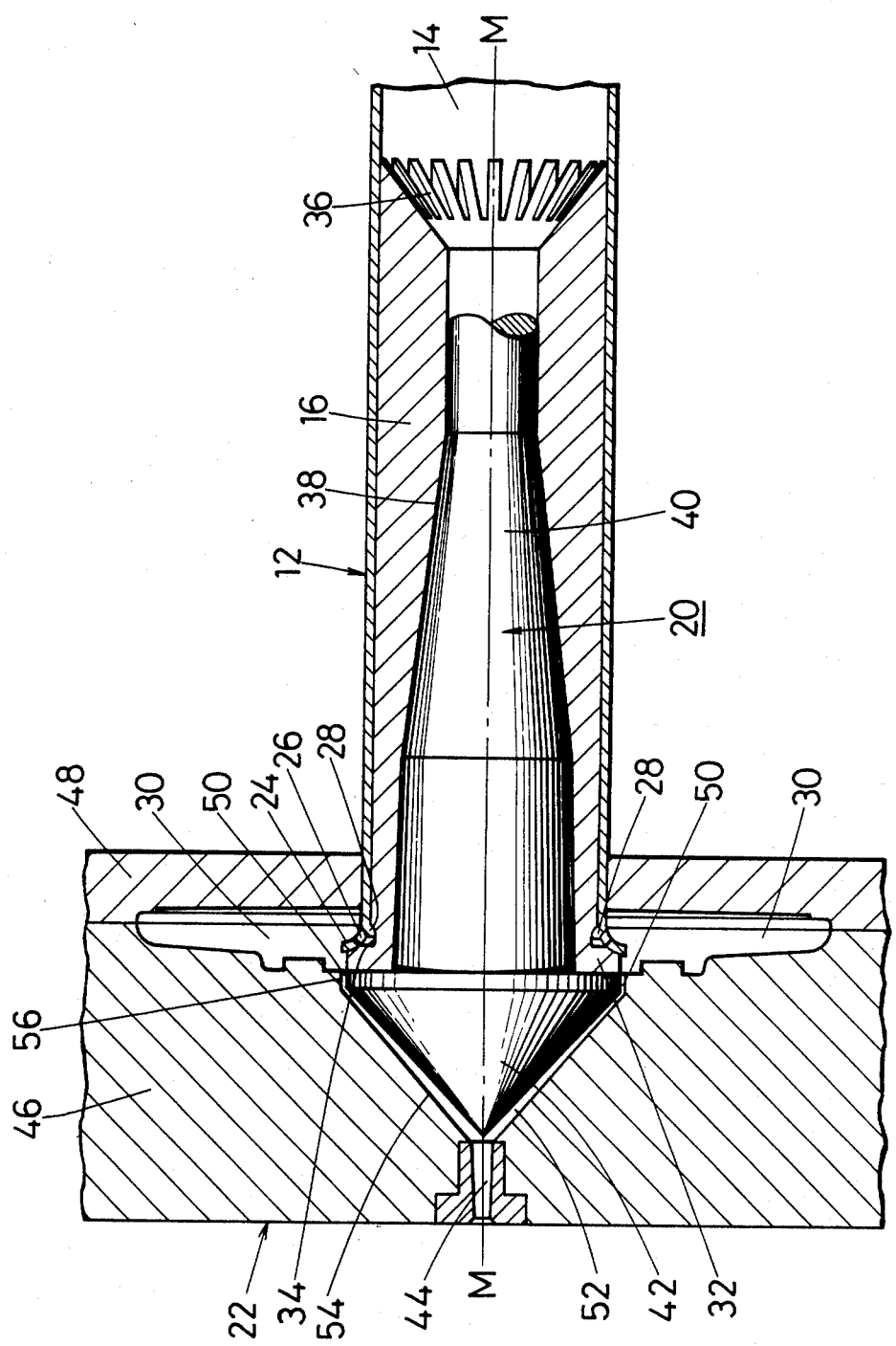
FIGS. 2 and 3 are cross-sectional views illustrative of the manner in which the method of the invention is carried out.
Figure 3:
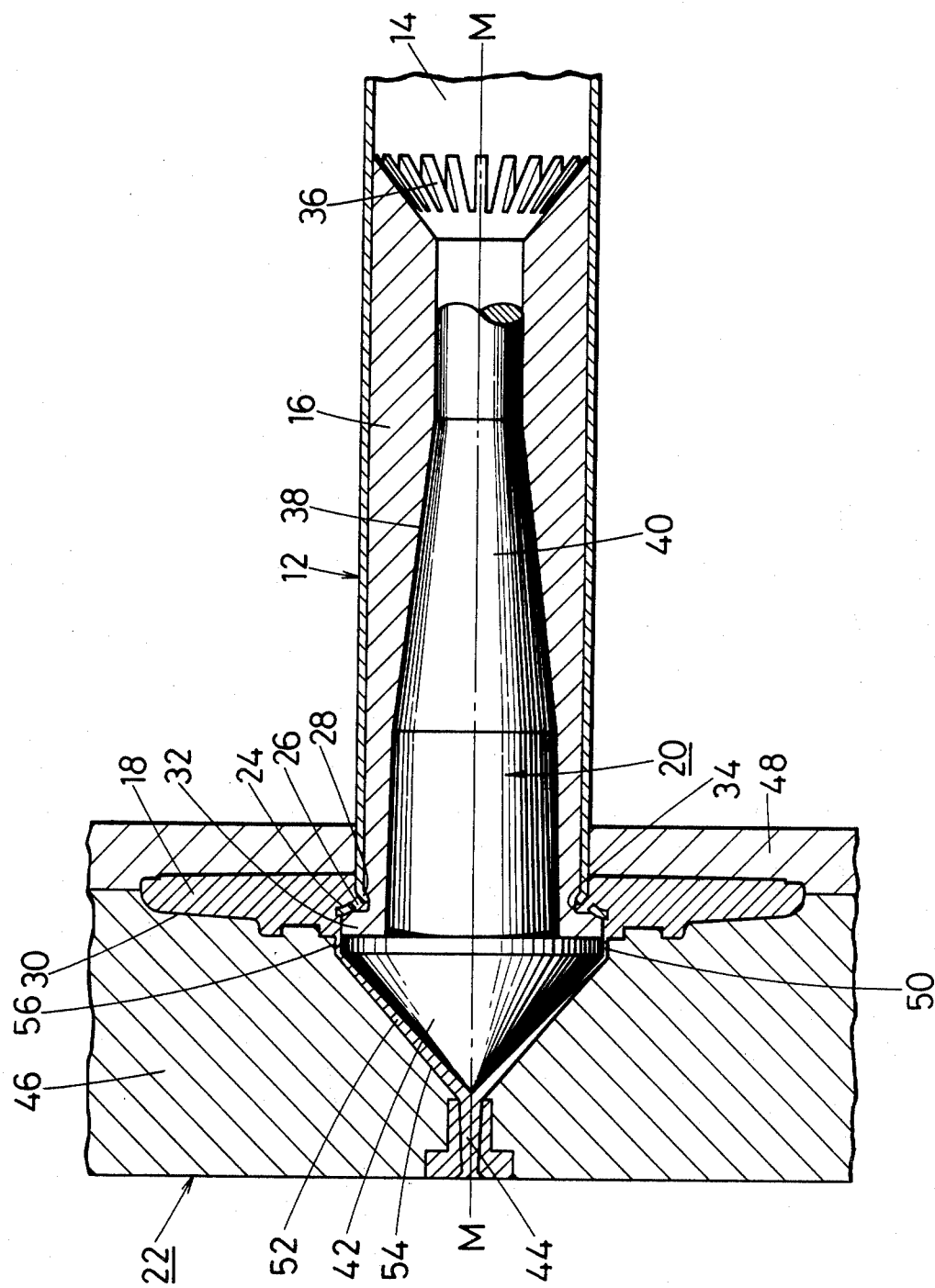
Figure 4:
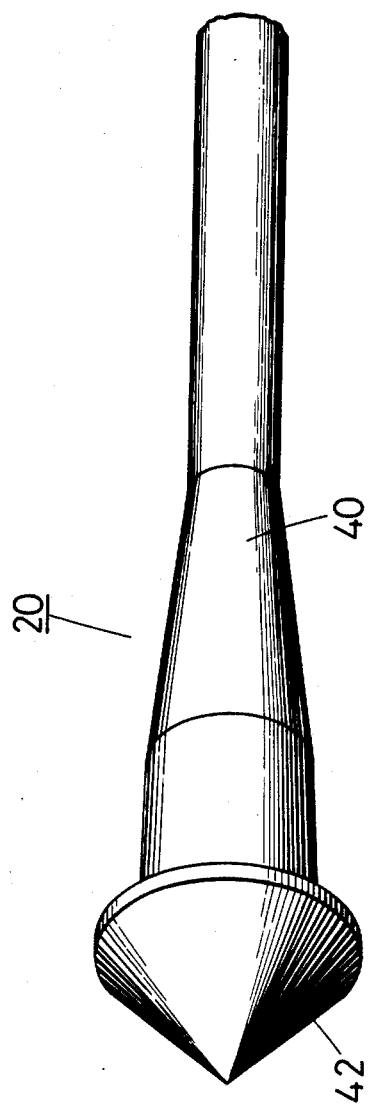
FIG. 4 is a perspective view of a core.
Figure 5:
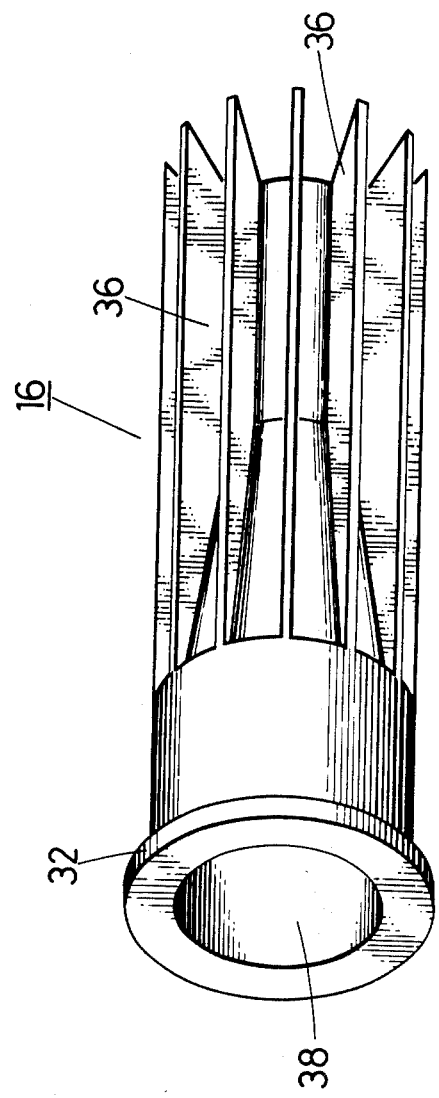
FIG. 5 is a perspective view of a bushing.

The bushing 16 is molded in a known manner, and has an overall cylindrical shape as shown in FIGS. 2, 3 and 5. The bushing 16 has on one end a stopper 32 projecting radially outwardly and an annular groove 34 at a proximal edge of the stopper 32. The bushing 16 has an outside diameter equal to the inside diameter of the winding shaft 12. The bushing 16 has on an opposite end a multiplicity of ribs 36 angularly spaced around an outer circumferential surface and extending axially of the bushing 16. The ribs 36 have an outside diameter slightly greater than the inside diameter of the winding shaft 12 so that when the bushing 16 is press-fitted into the bore 14 in the winding shaft 12, the bushing 16 will not easily be removed out of the winding shaft 12. The multiplicity of ribs 36 serve to increase the mechanical strength of the bushing 16. As shown in FIGS. 2 and 3, the bushing 16 has an axial bore 38 shaped in complementary relation to the outer profile of a shank 40 of a core 20 as described later on. The bore 38 has a larger inside diameter near the end of the bushing 16 which has the stopper 32, and is tapered off toward the other end, which has an axial extension of a uniform diameter. As described above, the bore 38 in the bushing 16 is shaped complementarily to the outer profile of the shank 40 of the core 20 so that the shank 40 will fit snugly in the bore 38 without undesirable wobbling motion.

The core 20 of metal which is to be inserted in the bore 38 in the bushing 16 has a conical head 42 on one end with the shank 40 projecting therefrom toward the other end. The shank 40 has a diameter larger near the head 42 and progressively tapered toward the other end, which has an axial extension of a uniform diameter. Therefore, the bore 38 in the bushing 16 and the shank 40 of the core 20 are complementarily shaped. Although not shown, the end of the axial extension of the shank 40 is sharply pointed so as to be reliably held in a sharply pointed recess defined in a movable mold. The head 42 of the core 20 is shown as being conical in shape. However, the head 42 may have a cross section similar to that of a convex lens or a rectangular cross section.

While the shank 40 of the core 20 has been described as being complementary in shape to the bore 38 in the bushing 16, the shank 40 may be of a cylindrical shape of uniform diameter, and the bore 38 may also be of a cylindrical shape of uniform diameter. With the bore 38 in the bushing 16 being thicker near the stopper 32 and tapered toward the other end with its extention having a uniform smaller diameter, it is not necessary to use a long spindle as is conventional for supporting the bobbin 10 when the same is to be used, but it suffices only to use a short spindle in complementary relation to the bore 38 in the bushing 16. This is advantageous in that any excessive energy upon driven rotation of the bobbin can be eliminated, and any noise produced at the time of rotation of the bobbin can be reduced. Furthermore, the time required for pulling the bobbin off the spindle after a filamentary material such as a yarn has been wound around the bobbin can be shortened. Where the bobbin is mounted on a twisting frame employing a number of such bobbins, the twisting frame may be of a reduced height for an improved efficiency of operation. The height of a twisting frame is 25 inches at most, but can be reduced to about half according to the present invention.

The basic construction of the mold 22 is substantially as known. The mold 22 is composed of a fixed mold member 46 having a sprue 44 and a movable mold member 48 disposed in confronting relation to the fixed mold member 46. The fixed and movable mold members 46, 48 have a cavity 30 defined in their confronting surfaces and shaped in complementary relation to the shape of the flange 18 molded around the winding shaft 12. The fixed mold member 46 has therein a space for accommodating the head 42 of the core 20 and for defining an annular gate 50 through which the resin material will be injected. The synthetic resin of which the flange 18 will be molded around the winding shaft 12 should be a thermoplastic synthetic resin such as nylon, polyphenylene sulfide, polybutylene terephthalate, polyphenylene ether, polycarbonate, polypropylene, polystyrene, or ABS. It is preferably to mix short glass figers, an inorganic filler, talc or the like into the such thermoplastic synthetic resin for an increased mechanical strength and accuracy.

The necessary components as described above are prepared prior to the manufacture of the bobbin 10.

The method of manufacturing the bobbin 10 will now be described.

The ribs 36 of the bushing 16 formed beforehand are forced into the bore 14 in the winding shaft 12 with the stopper 32 outside of the winding shaft 12. Small holes 26 are punched at equal angular intervals through the proximal edge of the coupling flange 24 of the winding shaft 12 into communication with the bore 14, with burrs 28 projecting into the annular groove 34 defined at the proximal edge of the stopper 32 of the bushing 16. The bushing 16 is now fixed reliably to the winding shaft 12 against easy removal therefrom. Where there is no need for such secure coupling between the winding shaft 12 and the bushing 16 dependent on the use of the bobbin 10, it is unnecessary to form the small holes 26 and burrs 28 in the winding shaft 12, and hence no annular groove 34 is required to be formed in the bushing 16 at the proximal edge of the stopper 32. If the small holes 26 and burrs 28 are not formed in the winding shaft 12 at the proximal edge of the coupling flange 24, an undercut (not shown) may be formed obliquely in an outer end surface of the stopper 32 outwardly toward the bore 38. While the undercut normally limits the thickness of the flange 18, it prevents an outward mechanical strength of the flange 18 from being reduced due to a reduced thickness of the flange from the coupling flange 18 to the barrel portion of the winding shaft 12 at the inner end of the flange 18.

Then, the shank 40 of the core 20 is fitted into the bore 28 in the bushing 16 with the head 42 outside thereof, thus closing the opening of the bushing 16, and the surface of the head 42 facing the shank 40 is held against the outer end surface of the stopper 32. Although not shown, the pointed end of the shank 40 is positioned and held reliably in the pointed recess in the movable mold member disposed at the end of the shank 40. Accordingly, the end of the shank 40 is supported securely against the injection pressure.

Thereafter, the coupling flange 24, the stopper 32, and the conical head 42 are inserted into the mold 22 until the head 42 is positioned in closely spaced relation to an inner surface 54 of the fixed mold member 46. The cavity 30 defined in the mold 22 for forming the flange 18 is held in coaxial relation to an axis M—M of the winding shaft 12, the cavity 30 being positioned radially outwardly of the winding shaft 12.

The clearance or space defined between the inner surface 54 of the fixed mold member 46 and the head 42 of the core 20 serves as a runner 52, with the gate 50 being defined as a small space between an inner peripheral surface 56 of the fixed mold member 46 and an outer peripheral surface of the head 42. The runner 52 and the gate 50 are held in communication with each other and extend fully around the head 42, the runner 52 also communicating with the sprue 44.

A melted mass of thermoplastic synthetic resin is forced through the sprue 44 under an injection pressure ranging from 750 to 1,000 kg/cm$^2$. The melted synthetic resin material flows through the runner 52 and the gate 50 and is injected radially outwardly into the cavity 30, core 20 serving to resist deformation of the bushing and winding shaft during the molding as does the metal shaft used during the molding of the other flange by conventional means as described above.

Since the synthetic resin material is introduced by the conical head 42 into the cavity 30, no weld line is formed on the molded flange 18. Upon elapse of a prescribed time after the injection molding, the synthetic resin material in the cavity 30 is cooled and solidified to thereby form the flange 18 in the cavity 30. Where the small holes 26 are defined in the winding shaft 12 at the proximal edge of the coupling flange 24, the synthetic resin material injected into the cavity 30 flows through the small holes 26 into the annular groove 34 in the bushing 16 so that the bushing 16 and the flange 18 are coupled by the synthetic resin material.

Then, the mold 22 is parted to expose the flange 18 molded around the winding shaft 12. Because the solidified synthetic resin material as it is cooled in the sprue 44, the runner 52, and the gate 50 is integrally joined to the flange 18, the solidified body of synthetic resin as cooled in the gate 50 is severed from the flange 18. Thereafter, the core 20 is removed from the bushing 16 to complete the bobbin 10.

Figure 6:
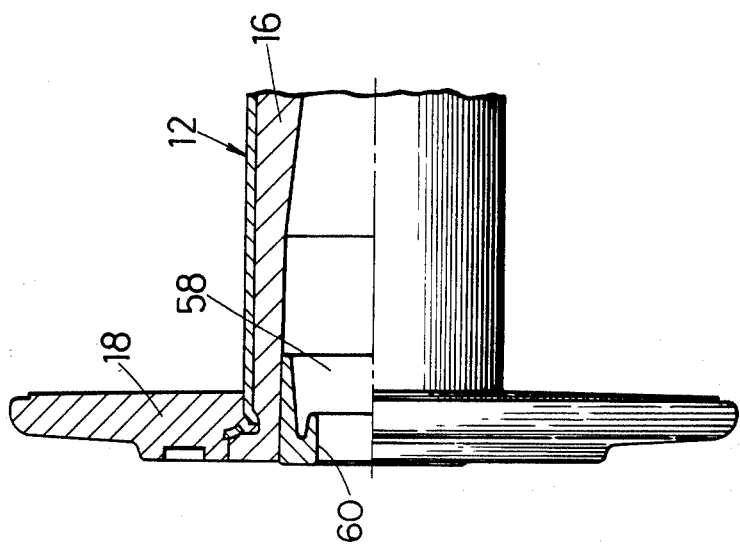
FIG. 6 is a fragmentary cross-sectional view showing a bearing disposed radially inwardly of a flange.

For automatic doffing or rewinding the bobbin 10, it is necessary to reduce the size of the bore in the flange 18 since it is larger than the diameter of a spindle. This can be effected by placing and joining a bearing 58 of thermoplastic synthetic resin having a required bore 60 in the bore in the flange 18 as shown in FIG. 6. The bearing 58 may be bonded to the bushing 16 by an adhesive, but can be coupled more effectively by the coupling method which the inventor has disclosed in U.S. Pat. No. 3,980,248.

More specifically, the bobbin 10 is fixed in position, and the bearing 58 is held in the bore in the flange 18. The bearing 58 is then rotated at high speed to produce a frictional heat between the outer peripheral surface of the bearing 58 and the inner peripheral surface of the bore in the flange 18 so that the mating surfaces will be fused and chemically joined to each other.

Such coupling is stabler than adhesive bonding and the fused surfaces will not be separated. It is important that the frictional surfaces be composed of male and female surfaces of certain shapes.

The bearing 58 should be of the same thermoplastic synthetic resin as that of the flange 18.

With the arrangement of the present invention, the core is fitted into the bushing in the end of the winding shaft, the runner and the annular gate are defined in coaxial alignment with the axis of the winding shaft between the core and the inner peripheral surface of the fixed mold member of the mold, and the synthetic resin material is injected into the cavity in the mold around the winding shaft through the runner and the gate to thereby mold the flange. This process does not produce any weld line which would be formed in the conventional injection molding process.

The injection pressure acts uniformly in the entire cavity or on the overall flange so that the synthetic resin material will not have different densities of molecular orientations.

The formed flange will therefore be subjected to no warping or vibrations and have small out-of-roundness and an increased mechanical strength. The bobbin for industrial use thus formed will be rotated stably at high speed with good balancing performance.

According to a severe test conducted by an official testing authority in Japan on a bobbin which was manufactured by the process of the invention and had an outside diameter of 55 mm and a wall thickness of 2.0 mm with the flange having an outside diameter of 152 mm and a wall thickness of 19 mm, the bobbin endured a maximum breaking load of 4,980 kg and was found to have a mechanical strength about twice that of bobbins of the same dimensions.

Although a certain preferred embodiment has been shown and described, it should be understood that many changes and modifications may be made therein without departing from the scope of the appended claims.

What is claimed is:

1. A method of molding plastic flanges on opposite ends of a metal winding shaft of a bobbin for industrial use, comprising the steps of:
   (a) insert molding a first plastic flange on the first end of a metal winding shaft having a first end and a second end and a shaft bore extending from the first end to the second end;
   (b) forcing a plastic bushing having a forward end and a rearward end, and having a bushing bore extending from the forward end to the rearward end, forward end first, into the shaft bore from the second end of the shaft toward the first end thereof;
   (c) inserting a metal core, having a generally conical head at one end and an opposite end at the other end opposite end first, into the rearward end of the bushing bore so that the head closes the bushing bore at the second end of the shaft;
   (d) after said metal core inserting step, disposing the generally conical head, the second end of the winding shaft and the rearward end of the bushing in a mold having a shape which conforms to and is spaced from the head, having a sprue axially aligned with the conical tip of the head, and which provides a forwardly and radially outwardly extending runner between the sprue and an annular cavity surrounding the second end, the runner extending through the space between the mold and head and through an annular gate into the cavity;
   (e) molding a second flange at the second end of the shaft, including
     (1) injecting a hardenable molten resinous material radially outwardly and forwardly successively through the sprue, the runner and the gate into the cavity so as to fill the cavity; and such that the material will not have different densities of molecular orientations; and
     (2) hardening the resinous material in the cavity to form the second flange fixed to the second end of the winding shaft and without any weld line;
   (f) resisting deformation of the bushing and the winding shaft by the metal core during said step of molding a second flange; and
   (g) parting the mold and resin material in the sprue, the runner and the gate from the second flange, and withdrawing the core from the bushing bore.

2. A method as in claim 1, wherein the step of disposing includes disposing the rearward end of the bushing outward of the shaft bore so as to be exposed to the cavity, whereby the second flange is bound directly to the rearward end of the bushing during said hardening step.

3. A method as in claim 1, further including the steps of punching a plurality of holes in the winding shaft at a distal edge of a coupling flange thereof after the step of forcing the bushing into the bore in the winding shaft, and positioning the holes and a plurality of burrs in the winding shaft in confronting relation to an annular groove defined in the bushing at a proximal edge of a stopper of the bushing.

4. A method as in claim 1, further comprising the steps of providing a plastic bushing having at the forward end a plurality of ribs extending parallel to an axis of the bushing.

5. A method as in claim 1, further comprising the step of providing a metal core with a shank complementary in shape to the bore in the bushing for insertion in the bore in the bushing during said step of inserting the core.

6. A method of molding plastic flanges on opposite ends of a metal winding shaft of a bobbin for industrial use, comprising the steps of:
   (a) insert molding a first plastic flange on the first end of a metal winding shaft having a first end and a second end and a shaft bore extending from the first end to the second end;
   (b) forcing a plastic bushing having a forward end and a rearward end, and having a bushing bore extending from the forward end to the rearward end, forward end first, into the shaft bore from the second end of the shaft toward the first end thereof;
   (c) inserting a metal core, having a generally conical head at one end and an opposite end at the other end, opposite end first, into the rearward end of the bushing bore so that the head closes the bushing bore at the second end of the shaft;
   (d) after said metal core inserting step, disposing the generally conical head, the second end of the winding shaft and the rearward end of the bushing in a mold having a shape which conforms to and is spaced from the head, having a sprue axially aligned with the conical tip of the head, and which provides a forwardly and radially outwardly extending runner between the sprue and an annular cavity surrounding the second end, the runner extending through the space between the mold and head and through an annular gate into the cavity;
   (e) molding a second flange at the second end of the shaft, including
     (1) injecting a hardenable molten resinous material radially outwardly and forwardly successively through the sprue, the runner and the gate into the cavity so as to fill the cavity and such that the material will not have different densities of molecular orientations; and
     (2) hardening the resinous material in the cavity to form the second flange fixed to the second end of the winding shaft and without any weld line; and
   (f) parting the mold and resin material in the sprue, the runner and the gate from the second flange, and withdrawing the core from the bushing bore.

7. A method of molding plastic flanges on opposite ends of a metal winding shaft of a bobbin for industrial use, comprising the steps of:
- (a) insert molding a first plastic flange on the first end of a metal winding shaft having a first end and a second end and a shaft bore extending from the first end to the second end, the first flange having a hole axially of the shaft bore, the hole having a diameter less than the diameter of the shaft bore;
- (b) forcing a plastic bushing having a forward end and a rearward end, and having a bushing bore extending from the forward end to the rearward end, forward end first, into the shaft bore from the second end of the shaft toward the first end thereof, the bushing bore having a diameter greater than the diameter of the hole in the first flange;
- (c) inserting a metal core, having a generally conical head at one end and an opposite end at the other end, opposite end first, into the rearward end of the bushing bore so that the head closes the bushing bore at the second end of the shaft, the metal core having a diameter greater than the diameter of the hole in the first flange;
- (d) after said metal core inserting step, disposing the generally conical head, the second end of the winding shaft and the rearward end of the bushing in a mold having a shape which conforms to and is spaced from the head, having a sprue axially aligned with the conical tip of the head, and which provides a forwardly and radially outwardly extending runner between the sprue and an annular cavity surrounding the second end, the runner extending through the space between the mold and head and through an annular gate into the cavity;
- (e) molding a second flange at the second end of the shaft, including
  - (1) injecting a hardenable molten resinous material radially outwardly and forwardly successively through the sprue, the runner and the gate into the cavity so as to fill the cavity and such that the material will not have different densities of molecular orientations; and
  - (2) hardening the resinous material in the cavity to form the second flange fixed to the second end of the winding shaft and without any weld line;
- (f) resisting deformation of the bushing and the winding shaft by the metal core during said step of molding a second flange; and
- (g) parting the mold and resin material in the sprue, the runner and the gate from the second flange, and withdrawing the core from the bushing bore.

* * * * *